United States Patent [19]  [11] 4,336,211
Asai et al.  [45] Jun. 22, 1982

[54] METHOD FOR THE PREPARATION OF SHAPED ARTICLES OF A VINYL CHLORIDE BASED RESIN HAVING IMPROVED SURFACE PROPERTIES

[75] Inventors: Michihiko Asai; Yoshio Suda, both of Tokyo; Kiyoshi Imada, Saitama; Susumu Ueno; Hirokazu Nomura, both of Ibaraki, all of Japan

[73] Assignees: Agency of Industrial Science and Technology; Shin-Etsu Chemical Company, Limited, both of Tokyo, Japan

[21] Appl. No.: 206,992

[22] Filed: Nov. 14, 1980

[30] Foreign Application Priority Data

Nov. 19, 1979 [JP] Japan ................................ 54-149769

[51] Int. Cl.³ .................................................. C08F 2/48
[52] U.S. Cl. ...................................... 264/22; 204/159.2
[58] Field of Search ..................... 264/22; 204/159.12, 204/159.2

[56] References Cited

U.S. PATENT DOCUMENTS 2,964,454 12/1960 Findley ............................ 204/159.2

FOREIGN PATENT DOCUMENTS 45-11828 4/1970 Japan ................................ 204/159.2

2009756 6/1979 United Kingdom .

OTHER PUBLICATIONS

Sarvetnick, Polyvinyl Chloride, Van Nostrand Reinhold Co., 1969, pp. 122-123.

*Primary Examiner*—James H. Derrington
*Attorney, Agent, or Firm*—Toren, McGeady & Stanger

[57] ABSTRACT

The invention provides a novel method for obtaining a shaped article of a vinyl chloride-based resin which is markedly insusceptible to the undesirable phenomenon of exudation or bleeding of the plasticizer and other additive ingredients contained therein on to the surface of the article. The method comprises formulating the resin composition for the fabrication of the shaped article with an epoxy compound containing, preferably, at least 2% by weight of the oxirane oxygen in the molecule in an amount of at least 0.05% by weight based on the vinyl chloride-based resin and irradiating the shaped article with ultraviolet light having a substantial energy distribution in the wavelength region of 200 nm or shorter. The shaped article obtained by the inventive method is remarkably insusceptible to the plasticizer bleeding even after prolonged outdoor exposure or irradiation with ultraviolet light having wavelengths longer than 290 nm.

1 Claim, No Drawings

METHOD FOR THE PREPARATION OF SHAPED ARTICLES OF A VINYL CHLORIDE BASED RESIN HAVING IMPROVED SURFACE PROPERTIES

BACKGROUND OF THE INVENTION

The present invention relates to a method for the preparation of a shaped article of a vinyl chloride-based resin having improved surface properties. More particularly, the invention relates to a method for the preparation of a shaped article of a vinyl chloride-based resin, of which the undesirable phenomenon of bleeding or exudation of the plasticizer and other additive ingredients contained therein is greatly reduced by imparting improved properties to the surface thereof.

As is well known, polyvinyl chloride resins have found wide applications owing to their large versatility in the rigidity or flexibility of the articles shaped therewith by formulating with or without a plasticizer. Their applications extend to the fields not only where rigid shaped articles are required but also where flexibility of the shaped articles is an essential condition including films, sheets, synthetic leathers, tubes, hoses, bags, packing materials, coating materials and the like to be used as a medical tool, wrapping material for foods, insulating material for electric wires, material for agricultural use, building material and the like.

One of the difficult problems in the plasticized, flexible shaped articles of a vinyl chloride-based resin is the mobility of the plasticizer contained therein that the plasticizer migrates toward and exudes on the surface of the article in the long run. This phenomenon is called bleeding.

Bleeding or exudation of the plasticizer is undesirable because of the less pleasant appearance, denaturation and decreased durability of the shaped article along with the problem of safety due to the transfer of the plasticizer, which may be toxic more or less, from the shaped article to a second body in contact with the shaped article. Therefore, the application of a plasticized shaped article of a vinyl chloride-based resin is largely limited, in particular, for medical and foodstuff use. There has been proposed a method for overcoming the above described problem, according to which the surface of the plasticized shaped article of a polyvinyl chloride resin is irradiated with ultraviolet light predominantly in the wavelength region of 200 nm or shorter so as that a high-density crosslinked layer is formed on or in the vicinity of the surface of the shaped article to be effective to prevent migration and exudation of the plasticizer and other additive ingredients on the surface of the shaped article (see, for example, Japanese Patent Disclosure 54-64573).

The above described method of the treatment with the so-called vacuum-ultraviolet light still has a problem that the effect of the treatment is not always sufficiently lasting but the crosslinked layer once formed on the surface of the article is subject to degradation when the article is subsequently irradiated with ultraviolet light of longer, say, 290 nm or longer, wavelengths or when the article is subjected to outdoor exposure for a long period of time to return to the surface condition before the vacuum-ultraviolet irradiation with consequent bleeding of the plasticizer and the like in the same degree as before the treatment.

SUMMARY OF THE INVENTION

It is an object of the present invention to provide a novel and improved method for the preparation of a shaped article of a vinyl chloride-based resin having improved surface properties as modified by the irradiation of the surface with ultraviolet light in order to reduce bleeding or exudation of the plasticizer and other additive ingredients contained in the shaped article, according to which the crosslinked layer once formed on the surface by the irradiation with ultraviolet light does not undergo degradation even by prolonged outdoor exposure or by the irradiation with ultraviolet light of wavelengths longer than 290 nm so that desired effect obtained in the ultraviolet irradiation is maintained over a long period of time.

The method of the present invention, which has been established as a result of the extensive investigations by the inventors with the above described object, comprises (a) admixing 100 parts by weight of a vinyl chloride-based resin with at least 0.05 part by weight of an epoxy compound to give a resin composition, said epoxy compound preferably having at least 2% by weight of oxirane oxygen in a molecule, (b) fabricating the resin composition into a shaped article, and (c) irradiating the surface of the shaped article with ultraviolet light having a substantial energy distribution in the wavelength region of 200 nm or shorter.

DETAILED DESCRIPTION OF THE PREFERRED EMBODIMENTS

The vinyl chloride-based resin to be fabricated into the shaped article in the inventive method may be either a homopolymeric polyvinyl chloride resin or a copolymeric resin mainly composed of vinyl chloride with a minor amount of a comonomer. The comonomers copolymerized with vinyl chloride are exemplified by vinyl esters such as vinyl acetate, vinyl ethers, acrylic and methacrylic acids and esters thereof, maleic and fumaric acids and esters thereof, maleic anhydride, aromatic vinyl compounds such as styrene, vinylidene halides such as vinylidene chloride, acrylonitrile, methacrylonitrile, olefins such as ethylene and propylene, and the like.

Shaped articles of a vinyl chloride-based resin are fabricated with a resin composition containing a plasticizer when flexibility of the shaped article is desired. Plasticizers suitable for use in vinyl chloride-based resins are exemplified by esters of phthalic acid such as dioctyl phthalate, butylbenzyl phthalate and the like, esters of aliphatic dibasic acids such as dioctyl adipate, dibutyl sebacate and the like, esters of pentaerithritol, glycol esters such as diethyleneglycol dibenzoate and the like, esters of fatty acids such as methyl acetylricinolate and the like, esters of phosphoric acid such as tricresyl phosphate, triphenyl phosphate and the like, esters of citric acid such as acetyl tributyl citrate, acetyl trioctyl citrate and the like and polyester compounds such as trialkyl trimellitates, tetra-n-octyl pyromellitate, polypropylene adipate and the like.

The resin composition to be fabricated into the shaped article may be formulated with other conventional additive ingredients such as heat stabilizers, lubricants, fillers and the like.

In the method of the present invention, it is essential that the resin composition to be fabricated into shaped articles contains an epoxy compound. Suitable epoxy compounds are exemplified by epoxidated fatty acid triglyceride, i.e. epoxidated fatty oils such as soybean oil, safflower oil, cottonseed oil, linseed oil, whale oil, tall oil, sunflower oil, fish oils and the like, epoxidated carboxylic or fatty acid monoesters such as methyl epoxystearate, octyl epoxystearate, stearyl epoxyacetate, glycidyl epoxystearate, vinyl epoxystearate and the like, epoxidated fatty acid diesters such as propyleneglycol dioleate, propyleneglycol ester of tall oil fatty acid, 1,3-butyleneglycol ester of tall oil fatty acid and the like, alicyclic epoxides such as dioctyl epoxyhexahydrophthalate, 3,4-epoxycyclohexylmethyl 3,4-epoxycyclohexane carboxylate and the like, aromatic epoxy compounds such as epoxystearyl benzoate, methyl epoxystearyl phthalate and the like and resinous epoxy compounds such as those obtained by the condensation reaction of bisphenol A and epichlorohydrine to form an epoxidated glycidyl ether, i.e. a bisphenol A-type epoxide, and the like.

It is preferable that the epoxy compound has at least 2% by weight of the oxirane oxygen in the molecule in order to obtain a shaped article having desired durability.

The amount of the epoxy compound to be admixed in the resin composition is at least 0.05 part by weight or, preferably, in the range from 0.5 to 10 parts by weight per 100 parts by weight of the vinyl chloride-based resin. When the amount is smaller than above, the desired crosslinked layer is formed difficultly on the surface of the shaped article by the irradiation with ultraviolet light of the wavelength of 200 nm or shorter while no additional effects can be obtained even by use of the epoxy compound in an amount in excess of 10 parts by weight per 100 parts by weight of the resin with certain adverse effects on the mechanical properties of the shaped articles.

The first step of the inventive method is compounding of the resin composition by blending the vinyl chloride-based resin with the epoxy compound and the other optional additive ingredients such as plasticizers, lubricants and the like. The resin composition is then fabricated into shaped articles by a known method conventionally employed in the shaping of vinyl chloride-based resins such as extrusion molding, injection molding, calendering, inflation, compression molding and the like according to the desired shape of the article and the properties of the resin composition. The shape of the article is not particularly limitative but it is preferable that uniformity in the effect of the ultraviolet irradiation is ensured over whole area of the surface on which the desired effect is to be exhibited.

The next step is the irradiation of the surface of the shaped article with ultraviolet light of the specified wavelengths. The light source for this ultraviolet irradiation is not particularly limitative provided that the ultraviolet light emitted therefrom has an energy distribution predominantly in the wavelength region of 200 nm or shorter. The difference between line spectra and a continuous spectrum is not significant. For example, low pressure mercury lamps are suitable emitting line spectra at 185 nm, 254 nm, 313 nm and 365 nm. The form of the ultraviolet lamp has little effect on the efficiency of the treatment. The ultraviolet irradiation is desirably carried out in vacuum but considerably good results are obtained even by the irradiation in air to impart the desired properties to the surface of the shaped article.

In the following, the method of the present invention is described in further detail by way of examples.

EXAMPLE 1

A resin sheet was prepared with a resin composition composed of 100 parts by weight of a homopolymeric polyvinyl chloride, 50 parts by weight of di(2-ethylhexyl)phthalate and 3 parts by weight of a calcium-zinc based stabilizer. This sheet was irradiated for 2 minutes in air with a 30 watts low pressure mercury lamp. This lamp was made of a sealed tube of high-quality quartz glass filled with mercury vapor and argon gas and emitting line spectra at 185 nm, 254 nm, 313 nm and 365 nm.

The thus irradiated sheet was divided into two pieces, one of which is immediately subjected to the determination of the amount of the plasticizer extractable with n-hexane in the procedure described below and the other of which was subjected to accelerated weathering for 100 hours in a weathering accelerator by irradiating with ultraviolet light which might cause degradation of the cross-linked layer on the surface once formed by the former irradiation with ultraviolet light of short wavelengths followed by the same extraction test with n-hexane. The results are shown in Table 1.

Procedure for the determination of the extractable plasticizer with n-hexane: the sample sheet was placed on the bottom of a cylindrical extraction vessel of 100 ml capacity and 50 ml of n-hexane were introduced into the vessel to be contacted with 26 cm$^2$ area of the surface of the sample sheet. The vessel was shaken at 37° C. for 2 hours and a portion of the solvent was taken and analyzed gas chromatographically for the amount of the plasticizer extracted thereinto.

EXAMPLE 2

The experimental procedure was just the same as in the preceding example except that the resin sheet was prepared with a resin composition additionally containing 2 parts by weight of an epoxidated soybean oil having about 6.5% by weight of the oxirane oxygen per 100 parts by weight of the resin. The results of the solvent extraction test are also shown in Table 1.

EXAMPLE 3

A resin sheet was prepared similarly to Example 1 with 30 parts by weight of di(2-ethylhexyl)adipate instead of di(2-ethylhexyl)phthalate. The irradiation with ultraviolet light was carried out with a similar low pressure mercury lamp of 50 watts power for 3 minutes in an atmosphere of reduced pressure of 10 Torr. The thus treated sheet was divided into two pieces and the amount of the plasticizer extraction was determined in the same manner as in Example 1 either before or after the acclerated weathering to give the results shown in Table 1.

EXAMPLE 4

The experimental procedure was just the same as in Example 3 except that the resin sheet was prepared with a resin composition additionally containing 5 parts by weight of an epoxidated soybean oil having about 4% by weight of the oxirane oxygen per 100 parts by weight of the resin. The results of the solvent extraction test either before or after the accelerated weathering are shown in Table 1.

EXAMPLE 5

The experimental procedure was just the same as in Example 4 except that a Vycor glass filter was inserted between the sample sheet and the ultraviolet lamp in the irradiation so as that the light of 185 nm wavelength did not reach the sample sheet. The results of the solvent extraction test are shown in Table 1.

EXAMPLE 6

The experimental procedure was just the same as in Example 2 except that the amount of the epoxidated soybean oil was decreased to 0.04 part by weight. The results of the solvent extraction test are shown in Table 1.

EXAMPLE 7

The experimental procedure was just the same as in Example 2 except that the epoxidated soybean oil formulated here had a lower degree of epoxidation containing about 1.5% by weight of the oxirane oxygen and instead the amount of the epoxidated soybean oil was increased to 5 parts by weight per 100 parts by weight of the resin. The results of the solvent extraction test are shown in Table 1.

EXAMPLE 8

A resin sheet was prepared with a resin composition composed of 100 parts by weight of a polyvinyl chloride resin, 50 parts by weight of di(2-ethylhexyl)phthalate as a plasticizer, 3 parts by weight of a tin-containing stabilizer and 1 part by weight of octyl epoxystearate containing about 3.5% by weight of the oxirane oxygen. Irradiation with ultraviolet light and the solvent extraction test were carried out in just the same manner as in Example 2 and the results of the solvent extraction test are shown in Table 1.

EXAMPLE 9

The experimental procedure was just the same as in Example 8 except that octyl epoxystearate was replaced with the same amount of di(2-ethylhexyl)epoxyhexahydrophthalate containing about 3.4% by weight of the oxirane oxygen. The results of the solvent extraction test are shown in Table 1.

EXAMPLE 10

The experimental procedure was just the same as in Example 8 except that octyl epoxystearate was replaced with the same amount of a bisphenol A condensation type epoxy resin (MARK EP-11, a tradename by Adeka Argus Chemical Co.) containing about 6.8% by weight of the oxirane oxygen. The results of the solvent extraction test are shown in Table 1.

TABLE 1

| Example No. | Epoxy compound Compound | Amounts, parts by weight | Extraction of plasticizer, mg/26 $cm^2$ Before weathering | After weathering |
|---|---|---|---|---|
| 1 | None | — | 1 | 80 |
| 2 | Epoxidated soybean oil | 2 | 0 | 3 |
| 3 | None | — | 1 | 128 |
| 4 | Epoxidated soybean oil | 5 | 0 | 3 |
| 5 | Epoxidated soybean oil | 5 | 98 | 146 |
| 6 | Epoxidated soybean oil | 0.04 | 1 | 63 |
| 7 | Epoxidated soybean oil | 5 | 1 | 21 |
| 8 | Octyl epoxystearate | 1 | 1 | 2 |
| 9 | Di(2-ethylhexyl) epoxyhexahydrophthalate | 1 | 0 | 1 |
| 10 | Bisphenol A condensation type epoxy resin | 1 | 1 | 4 |

What is claimed is:

1. A method for the preparation of a shaped article of a vinyl chloride-based resin insusceptible to the exudation of a plasticizer or other additive ingredient contained therein which comprises the steps of
   (a) admixing a plasticizer, 100 parts by weight of a vinyl chloride-based resin with from 0.5 to 10 parts by weight per 100 parts by weight of the vinyl chloride-based resin of an epoxy compound to give a resin composition, said epoxy compound containing at least 2% by weight of the oxirane oxygen in a molecule,
   (b) fabricating the resin composition into a shaped article, and
   (c) irradiating the surface of the shaped article with ultraviolet light having a substantial energy distribution in the wavelength region of 200 nm or shorter.

* * * * *